United States Patent [19]

Theall

[11] 4,355,423
[45] Oct. 19, 1982

[54] TRANSLATOR SYSTEM FOR CONVERTING UNIPOLAR FIBER OPTIC SIGNALS TO BIPOLAR SIGNALS UTILIZING MANCHESTER CODING

[75] Inventor: C. Earle Theall, Weston, Conn.

[73] Assignee: The Singer Company, Little Falls, N.J.

[21] Appl. No.: 106,065

[22] Filed: Dec. 20, 1979

[51] Int. Cl.³ .............................................. H04B 9/00
[52] U.S. Cl. ...................................... 455/608; 375/87; 455/619
[58] Field of Search .................. 375/4, 87, 104, 117; 360/42; 371/62; 455/608, 619

[56] References Cited

U.S. PATENT DOCUMENTS

| | | | |
|---|---|---|---|
| 3,938,082 | 2/1976 | Schowe, Jr. | 375/87 |
| 3,979,746 | 9/1976 | Jarrett | 455/608 |
| 4,257,125 | 3/1981 | Theall | 455/619 |

*Primary Examiner*—Joseph A. Orsino, Jr.
*Attorney, Agent, or Firm*—Morris Liss; Thomas W. Kennedy

[57] ABSTRACT

Fiber optic signals of the unipolar Manchester type undergo translation by a logic circuit system to a bipolar type. The system is capable of differentiating between the occurrence of a message gap and valid data or synchronization signals.

8 Claims, 10 Drawing Figures

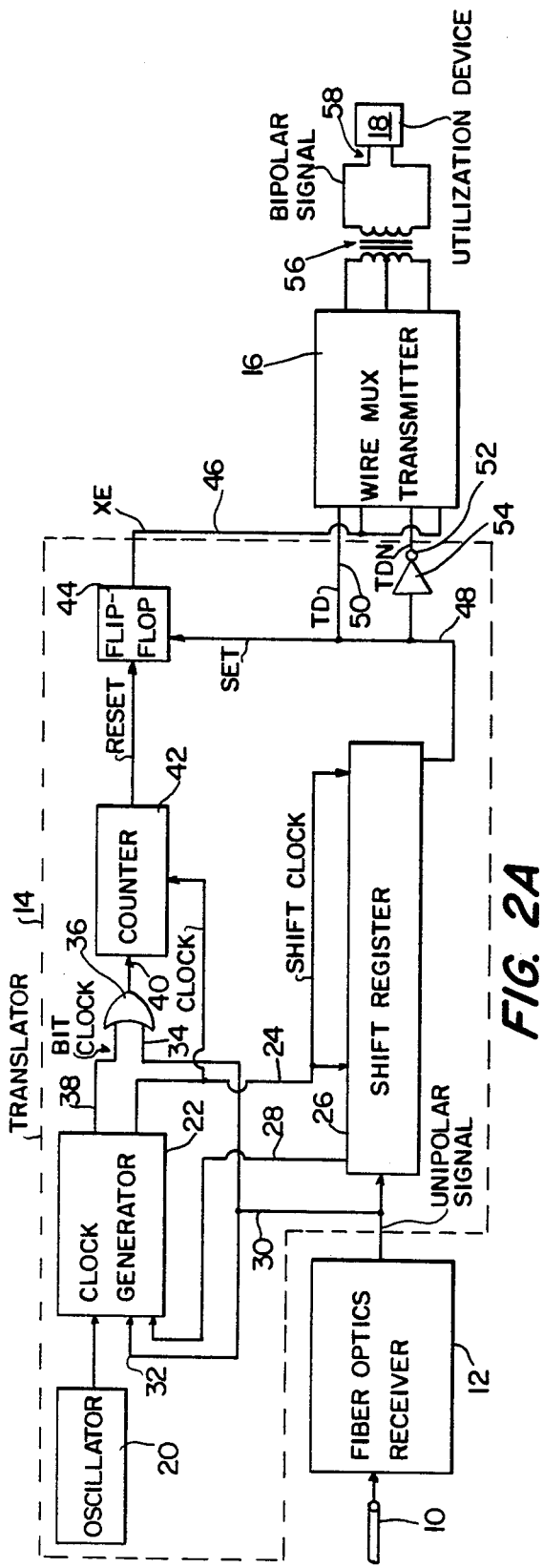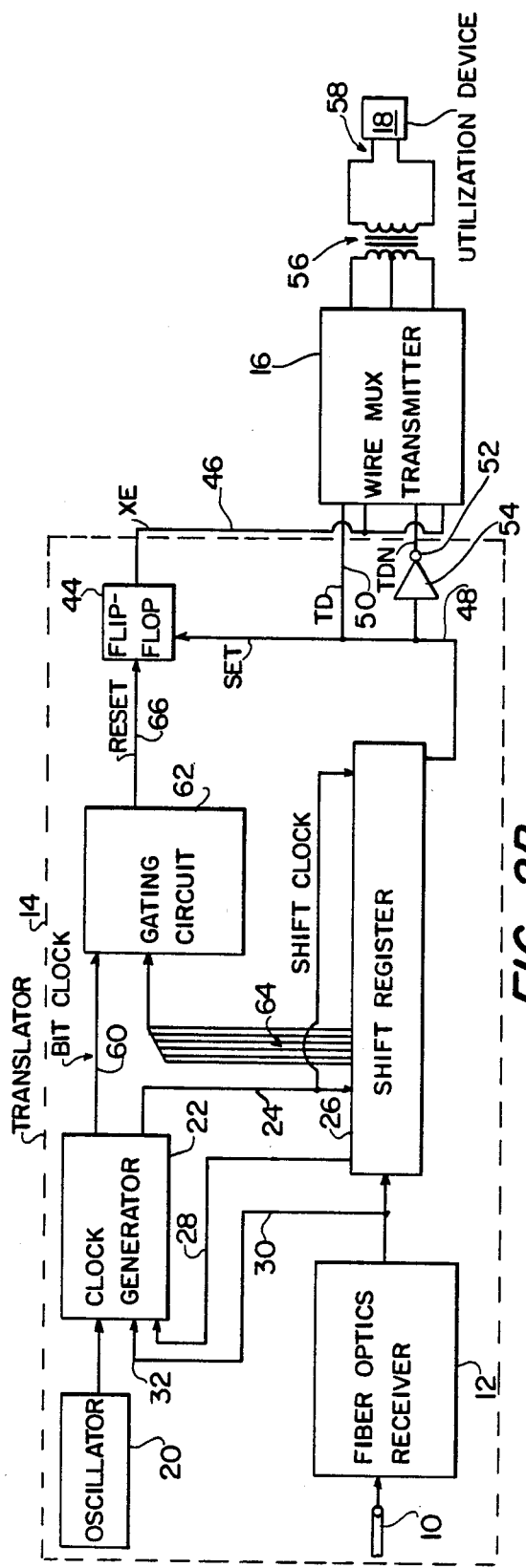

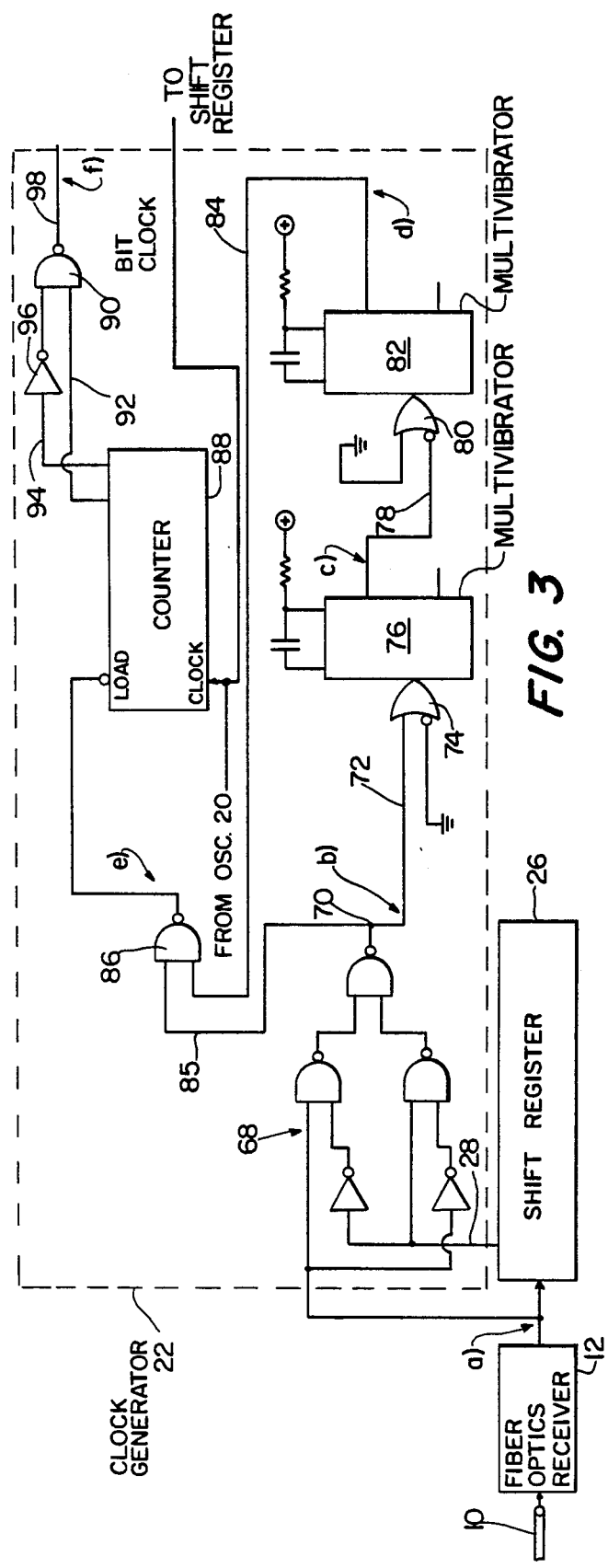
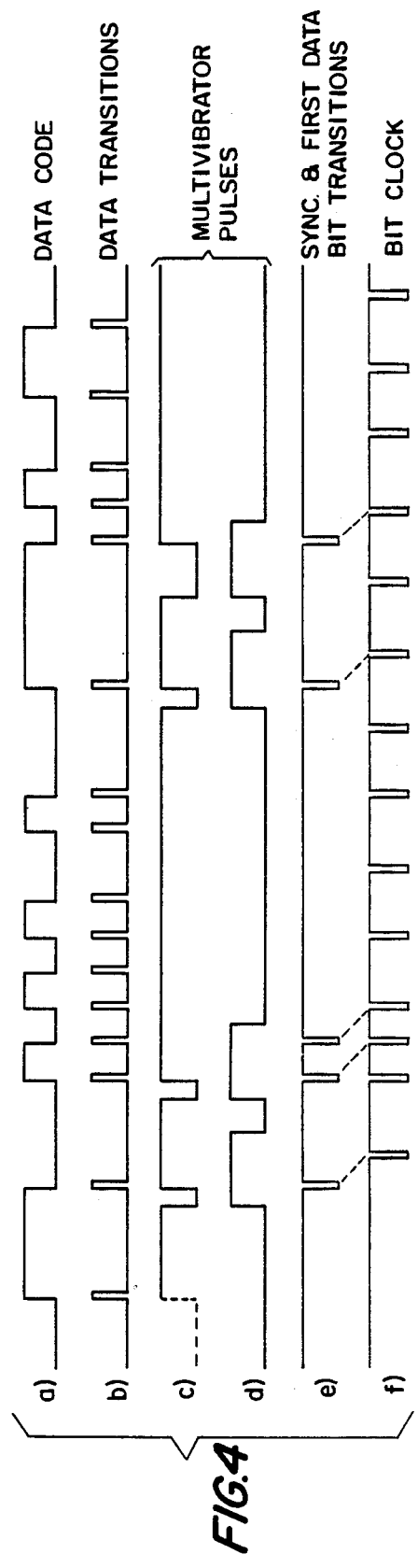
FIG. 3
FIG. 4

TRANSLATOR SYSTEM FOR CONVERTING UNIPOLAR FIBER OPTIC SIGNALS TO BIPOLAR SIGNALS UTILIZING MANCHESTER CODING

BRIEF DESCRIPTION OF THE PRIOR ART

The conversion of unipolar (2 level) signals to bipolar (3 level) signals is well established in the prior art. The translation of such signals is often needed where a specified data processing system must operate with an input device which generates data of a different level characteristic. In previous data communication systems Manchester Code has been used. This code is employed in the present invention. Hard wire input devices have been used for inputting Manchester Code data to a processing system. However, in most cases the input message has a known length. This precludes the data processing system from confusing the occurrence of message gaps with data or synchronization signals. With the improvement of fiber optics technology, it is desirable to develop a translator system which is capable of taking the inherent unipolar signals of fiber optics and translating them to a bipolar signal. In many applications, the utilization of the Manchester Code is desirable since this code generates an output signal having a zero DC average which permits such signals to undergo transformer coupling to a data processing system. A second major advantage of Manchester Code is the inclusion of synchronization pulses prior to data pulses. The synchronization pulses may be positive or negative, thereby differentiating between an actual data word and a command word.

Although hard wire Manchester Code communication systems exist, the inventor is unaware of any which utilize a fiber optics input. The inclusion of such an input would lower the cost of an overall communication system as well as contribute to electrical isolation in a data processing system which is an objective of high priority in aircraft systems. In the past, the use of fiber optics in conjunction with a Manchester Code has not been achieved, possibly due to the inherent difficulty of determining when an "off" signal from a fiber optics receiver represents a message gap or a continuous stream of data holding the same level for a period of time.

BRIEF DESCRIPTION OF THE PRESENT INVENTION

The present invention seeks to rectify the inherent problem of using fiber optics in a Manchester Code communication system. The logic circuitry of the invention is capable of differentiating between a message gap versus continuous data. This enables the inclusion of a fiber optics input, with its high electrical isolation qualities, with a data processing system specified for Manchester Code communication.

The above-mentioned objects and advantages of the present invention will be more clearly understood when considered in conjunction with the accompanying drawings, in which:

BRIEF DESCRIPTION OF THE FIGURES

FIG. 2A is a block diagram of the basic system representing a first embodiment of the present invention.

FIG. 2B is a block diagram of the basic system representing a second embodiment of the present invention.

FIG. 3 is a logic diagram of a clock generator used in the present invention.

FIG. 4 is a comparative timing diagram of various points in the clock generator of FIG. 3.

DETAILED DESCRIPTION OF THE INVENTION

Conversion from unipolar fiber optics Manchester Code signals to bipolar, wired transmissions, requires the identification of portions of a message including: message gap, synchronization pulse, or data bit. Then, the unipolar (2 level) signal must be converted into an appropriate bipolar (3 level) signal having corresponding portions.

Because of the nature of optical energy transmission, signals are unipolar (i.e., on or off). Manchester fiber optics signals require formatting in accordance with the Manchester Code but, nevertheless, they are unipolar. Current data communication and processing systems utilizing wired Manchester transmission require bipolar signals (3 levels), namely, positive, negative and off (zero). In the event Manchester Code signals are utilized in military communication systems, the signal format must be in accordance with MIL. STD 1553 B.

Figures 1A, 1B, 1C, 1D:
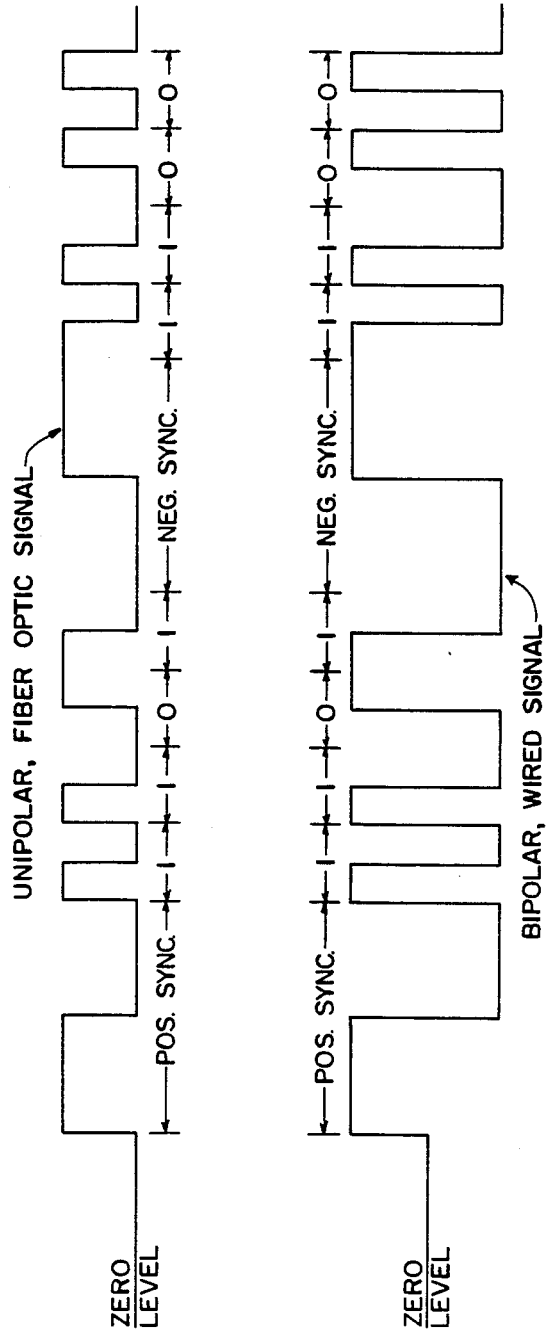
FIG. 1A is a fiber optic unipolar signal for illustrating the operation of the present invention.
FIG. 1B is a bipolar, wired signal corresponding to that of FIG. 1A.
FIG. 1C is a unipolar fiber optic signal including a message gap.
FIG. 1D is a bipolar, wired signal indicating the detection of the message gap in FIG. 1C.

Referring to FIG. 1A, a typical unipolar, fiber optics signal is illustrated. The signal is seen to begin with a positive synchronization pulse followed by the word including bits 1101. A second word is preceded by a negative synchronization signal and followed by bits 1100. It is pointed out that the signal of FIG. 1A has the format of Manchester Code. In accordance with the present invention, as will be explained hereinafter, the signal of FIG. 1B represents a bipolar wired signal in Manchester Code, corresponding to the unipolar signal of FIG. 1A. The essence of the invention is the translation of unipolar signals such as FIG. 1A to bipolar signals such as FIG. 1B. FIG. 1C represents another typical signal wherein the end of the first word is followed by a message gap. In order to translate the signal of FIG. 1C, the invention as set forth hereinafter must be capable of detecting the message gap and returning any generated bipolar signal to the zero level as shown in the interval immediately preceding the second positive synchronization pulse in FIG. 1D. As will be noted from the signals shown in FIGS. 1A–1D, data bits and sync. pulses are translated as follows: the positive and zero levels of the unipolor signal become positive and negative levels, respectively, in the bipolar signal. However, note that although the zero level of the unipolar signal translates to a negative level within the bipolar word, both signals retain zero level between messages (message gap). The bipolar signal as shown in FIG. 1D illustrates the shortest allowable message gap in Manchester Code which, in a typical system, such as the present inventions, may be equivalent to 2 microseconds, but is not limited thereto.

Referring to the system of the present invention, a first embodiment is shown in FIG. 2A wherein fiber optics 10 are connected to an appropriate receiver 12 such as that commercially available from Hewlett Packard Company and identified as Model HFBR-2001. The receiver 12 generates a unipolar signal, in Manchester Code as received from the fiber optics, which is fed to the translator, generally indicated by reference numeral 14. The translator detects the occurrence of message gaps and formats the unipolar signal accordingly. The output of the translator drives a wire transmitter 16 which generates a bipolar signal at the output thereof for a utilization device 18 which does not form part of the present invention, per se. Typically, such a utilization device would include a communication link to a data processing system, none of which are illustrated. The transmitter is of known design and available in the MIL-STD-1553A multiplex terminal marketed by the present assignee.

Referring now to the specifics of the translator 14, a shift register 26 stores and delays the output of the fiber optics receiver 12 for a relatively short period of time, typically the 2 microseconds previously mentioned as the shortest allowable message gap. The output of oscillator 20 drives a first input of clock generator 22 while the output of fiber optics receiver 12 drives a second input 32 of the clock generator 22, along lead 30. The clock generator generates a bit clock signal as later described. A third input to the clock generator occurs along lead 28 connected to the first stage of shift register 26. The output of receiver 12 is further connected, via lead 30, to an input 34 of the OR gate 36. The latter has a second input connected from output 38 of clock generator 22. The output 40 of OR gate 36 is connected to a first input of counter 42 while the clock input of this counter is connected in parallel with a second output of the clock generator 22 and the shift clock line 24 of the shift register 26. In a typical application for which the present invention is intended, illustrative frequencies may be:

data rate: 1 megabit/sec.
oscillator: 16 MHZ
shift clock: 8 MHZ
bit clock: 1 MHZ In the system shown in FIG. 2A, the counter 42 is advanced by each shift clock pulse appearing along lead 24 and is reset to zero by each mark (signal pulse) from the fiber optics receiver. A pulse received from the clock generator 22 initializes the counter to the start of a bit frame. If the counter 42 measures an interval equal to the shortest allowable message gap of 2 microseconds, without having been reset by a receiver output signal, it has indicated a signal-free 2 microsecond interval interpreted as a message gap. The counter 42 then resets flip-flop 44, connected at the output thereof, which in turn changes the state of the enabling signal along flip-flop output lead 46 and disables the input of transmitter 16 which otherwise transmits data from the shift register output lead 48. When, in the presence of a signal, a mark (signal pulse) reaches the output 48 of the shift register 26, the flip-flop 44 is set and an enable signal once again appears along lead 46 to permit further transmission of data from the shift register 26 through the transmitter 16. When the transmitter 16 is enabled, unipolar Manchester Code data is translated to a bipolar Manchester Code format and is transmitted to utilization device 18.

Considering the input to transmitter 16 in greater detail, the enabling signal along lead 46 will be hereinafter referred to as XE. The signal appearing along the output lead 48 from shift register 26 is branched as a second input 50 (TD) of the transmitter 16 and a third input 52 (TDN), via inverter 54. When XE=1 occurs, the transmitter is enabled to respond to the complementary inputs, TD and TDN. With TD=1 and TDN=0, the transmitter output is positive and is coupled through transformer 56 to the input 58 of utilization device 18. When TD=0 and TDN=1, the transmitter output is negative. When XE=0, the transmitter output is off, as occurs in a message gap condition.

Thus, the general requirements for unipolar-bipolar translation are:

1. For Message Start-up: turn on XE, enable transmitter 16, when and after a mark (TD is high). The complementary signals TD and TDN are in synchronism with on and off levels from the fiber optics receiver 12.

2. For Message End: turn off XE and disable the transmitter if no mark occurs for the minimum allowable message gap interval. In other words, a message gap is verified by the absence of a signal for an interval of time greater than the shortest allowable message gap.

Accordingly, in summary of the operation of the circuit shown in FIG. 2A, translation requires:

1. the delay of the fiber optic signal long enough for the anticipated, shortest allowable message gap indicative of a detection of a no-mark condition;

2. detection of a no-mark condition after the shortest allowable message gap;

3. detection of a mark condition at the input of transmitter 16; and 4. generation of a Manchester bit clock to synchronize delay and detection.

A second embodiment of the system just described in connection with FIG. 2A is shown in FIG. 2B. As will be noted, both systems are essentially the same except that in FIG. 2B a gating circuit 62, employing conventional gates such as AND gates, detects a signal-free two microsecond interval by detecting the storage of all zeros, as conveyed along gating input leads 64, in shift register 26. The bit clock along lead 60 from clock generator 22 synchronizes the signal delay and the detection of the two microsecond signal-free interval. Upon such detection, flip-flop 44 is reset along input lead 66 to shut off the transmitter 16.

Referring to FIG. 3, the logic circuitry of the clock generator 22 will now be examined in detail. In order to generate the bit clock at the output of the clock generator, the output from the fiber optics receiver 12 is fed to a first input of an EXCLUSIVE OR circuit generally indicated by reference numeral 68. A second input to this network is derived from the second or third stage of shift register 26.

FIG. 4 illustrates the signal flow through the clock generator 22 at various points indicated in FIG. 3 and the first signal shown in FIG. 4 corresponds to point "a" at the output of the fiber optics receiver 12. The output 70 of the EXCLUSIVE OR circuit 68 has signal "b" shown in FIG. 4 appearing thereat. The output from the EXCLUSIVE OR circuit is fed to a multivibrator 76 through a time delaying gate 74. In a typical circuit, the multivibrator may operate to generate a 1.25 microsecond pulse each time it is triggered by a data transition pulse along lead 72. This is shown by the third signal "c" in FIG. 4. This output at 78 then serves as a trigger to a second multivibrator 82, via time delaying gate 80. The output from this second multivibrator 82 is shown as the fourth signal "d" in FIG. 4. Multivibrators 76 and 82 function together as a masking pulse generator. The signal at "d" represents one microsecond pulse gates for gating synchronization pulses and data frame transitions through counter 88. To accomplish this, the signal at point "d" provides a first input, via lead 84, to NAND gate 86. The second input to the NAND gate is provided along lead 85 from the output of EXCLUSIVE OR circuit 68. The output from NAND gate 86 is connected to the load input of counter 88 and the signal appearing thereat is indicated at point "e" as well as the fifth signal appearing in FIG. 4. Only those pulses shown in the signal "e" are retained after the pulses in signal "b" are NANed with the pulses of signal "d", as generated by multivibrators 76 and 82. The pulses in signal "e" represent synchronization pulse and first data bit transitions. The counter is clocked from oscillator 20, as indicated, so that the counter becomes synchronized to the data frames. The last stage of counter 88 (e.g., a 16 bit counter) is fed along lead 94 to a first input of NAND gate 90, via inverter 96. A second input to the NAND gate is provided, along lead 92, from the fifteenth stage of the counter 88 to NAND gate 90. The resultant bit clock signal at the output of NAND gate 98 is indicated at point "f" which corresponds to the sixth signal illustrated in FIG. 4. The bit clock pulses are utilized by the system for the determination of the end of each received word.

The clock generator 22 of FIG. 3 utilizes the Manchester Code characteristics including:
1. the synchronization pulses have unique durations of 1.5 bit frame; and
2. there is a signal transition in the middle of every bit frame.

In operation of the circuit shown in FIG. 3, the Manchester synchronization field and first data bit frame are identified by the output of multivibrators 76 and 82, which serve as a masking pulse generator. The output from multivibrator 82 is a gating signal for the second synchronization transition and the middle transition of the first data bit frame. Neither multivibrator 76 nor 82 trigger on the 0.5 microsecond or 1.0 microsecond intervals within a word. The 1 microsecond pulses from the output of multivibrator 82 gates the synchronizing and data frame transitions through counter 88. With the clock occurring from oscillator 20, typically 16 MHZ, the 16 bit counter recycles every microsecond, the data bit period. Typically, the counter may be of the type industrially designated by the number 54LS163A. It cycles to yield a bit clock pulse at the end of each bit frame.

Figure 5B:
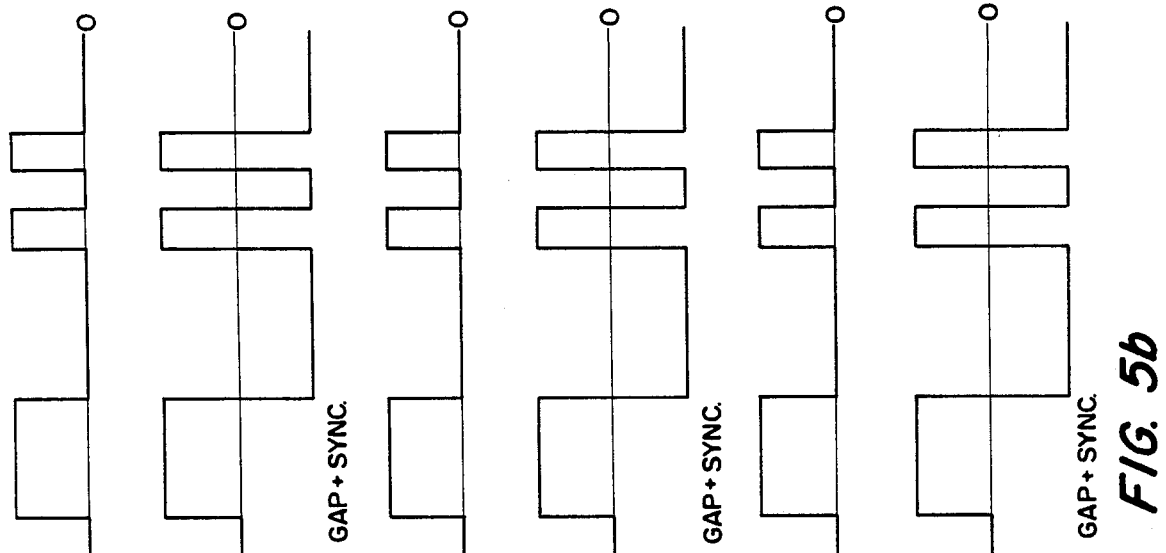
FIG. 5B indicates a number of illustrative unipolar and bipolar corresponding signals wherein a message gap exists.
Figure 5A:
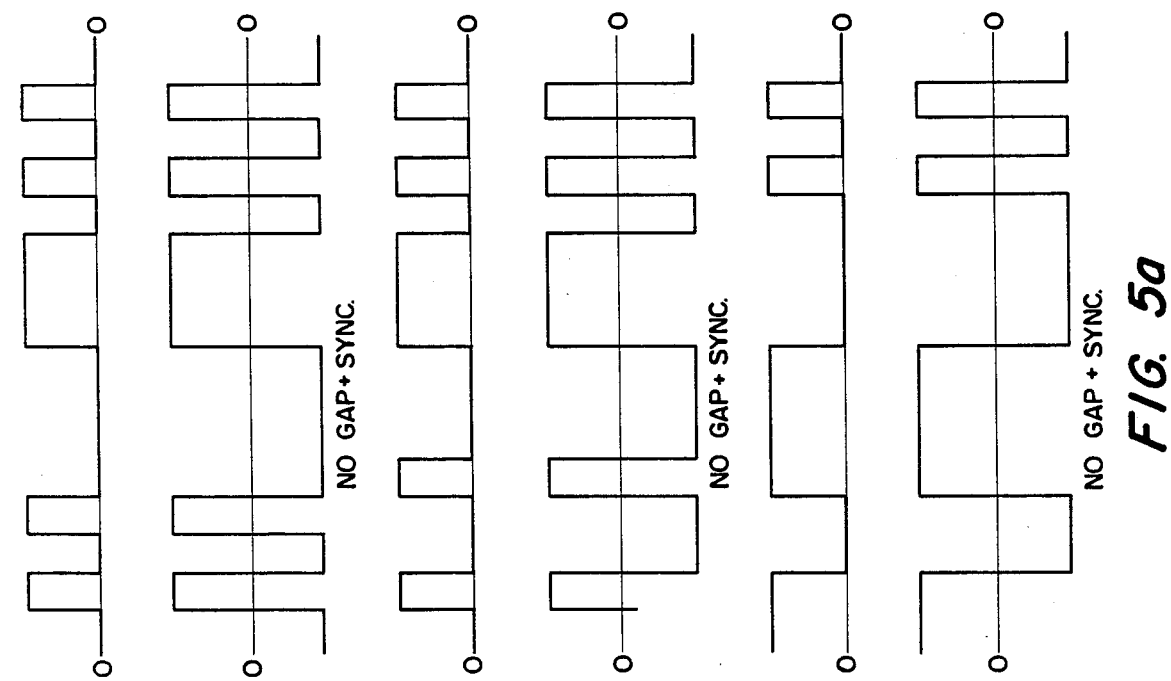
FIG. 5A indicates a number of illustrative unipolar and bipolar corresponding signals wherein no message gap exists.

The signals shown in FIG. 5A represent various typical converted signals wherein no message gap exists. In each set of signal pairs, the first is a unipolar Manchester Code representation while the second signal is a translated bipolar Manchester Code equivalent. A similar set of signal pairs is shown in FIG. 5B wherein various conditions are illustrated showing the existence of message gaps. A review of the signal representations in FIG. 5A and FIG. 5B illustrates that the minimum allowable message gap, for example 2 microseconds as previously explained, must be measured from the end of the data bit frame preceding a gap. The message ending must be identified to return the last bipolar data bit to zero.

It should be understood that the invention is not limited to the exact details of construction shown and described herein for obvious modifications will occur to persons skilled in the art.

I claim the following:

1. In a Manchester system for translating a received unipolar signal to a bipolar signal, the received signal having a predetermined shortest allowable message gap, the system comprising:
means for storing the received signal long enough to detect the occurrence of a shortest allowable message gap;
transmitting means for converting received unipolar signals to bipolar format;
detecting means connected at an input thereof to the storing means and at an output thereof to the transmitting means for enabling the conversion, by the transmitting means, until a gap in excess of the shortest allowable message gap occurs thereby terminating such conversion until a subsequent signal is received.

2. The subject matter set forth in claim 1 together with fiber optics, and receiving means connected at the input thereof to the fiber optics for producing the received unipolar signal.

3. The subject matter set forth in claim 2 wherein the detecting means comprises:
means for generating a clock signal for each bit frame in a message of a received signal;
counting means connected at its input to the output of the generating means for producing an output when a shortest allowable message gap has been exceeded; and
switching means having a first input connected to the storing means for enabling the conversion, when a signal is received, a second input of the switching means connected to the counting means output for terminating conversion when a shortest allowable message gap has been exceeded.

4. The subject matter set forth in claim 2 wherein the detecting means comprises:
means for generating a clock signal for each bit frame in a message of a received signal;
gating means connected at its input to the generating means and the storing means for producing an output when there is storage of a plurality of bits having the same level and signifying a message gap; and
switching means having a first input connected to the storing means for enabling the conversion, when data is received, a second input of the switching means connected to the gating means output for terminating conversion when the shortest allowable message gap has been exceeded.

5. The subject matter set forth in claim 3 wherein the clock generating means comprises:
means for generating trigger pulses in response to level transitions within each bit frame of a received signal;
second gating means connected to the output of the trigger generating means for masking preselected trigger pulses thereby retaining those pulses representing synchronization and first data bit transitions in the Manchester unipolar signal; and
means connected to the output of the second gating means for generating a clock signal.

6. The subject matter set forth in claim 5 wherein the storing means comprises a shift register.

7. The subject matter set forth in claim 4 wherein the clock generating means comprises:

means for generating trigger pulses in response to level transitions within each bit frame of a received signal;

second gating means connected to the output of the trigger generating means for masking preselected trigger pulses thereby retaining those pulses representing synchronization and first data bit transitions in the Manchester unipolar signal; and means connected to the output of the second gating means for generating a clock signal.

8. The subject matter set forth in claim 7 wherein the storing means comprises a shift register.

* * * * *